Figure 1:
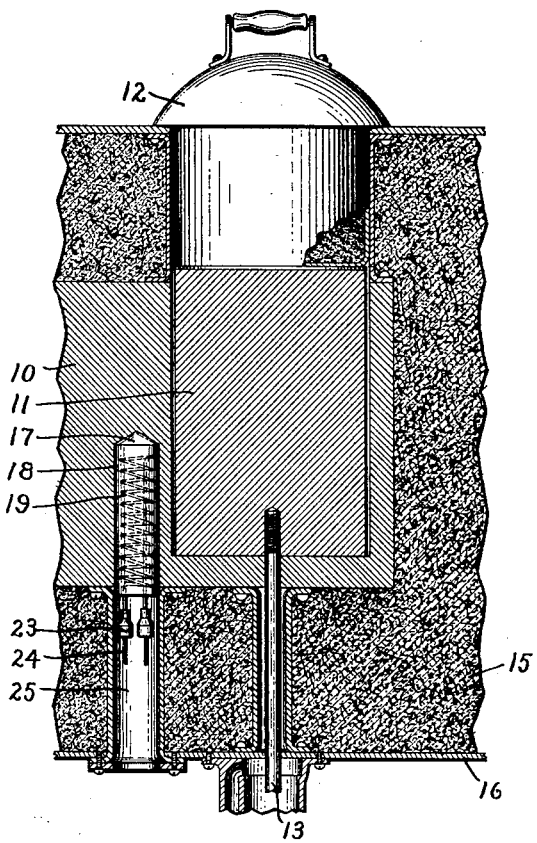

W. STANLEY.
ELECTRIC HEAT STORAGE SYSTEM.
APPLICATION FILED DEC. 21, 1912.

1,161,748.

Patented Nov. 23, 1915.

Witnesses
Chas B Stiker
J. Ellis Glen.

Inventor
William Stanley
by [signature]
His Attorney

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ELECTRIC HEAT-STORAGE SYSTEM.

1,161,748.      Specification of Letters Patent.      Patented Nov. 23, 1915.

Application filed December 21, 1912. Serial No. 737,990.

*To all whom it may concern:*

Be it known that I, WILLIAM STANLEY, a citizen of the United States, residing at Great Barrington, in the county of Berkshire and State of Massachusetts, have invented certain new and useful Improvements in Electric Heat-Storage Systems, of which the following is a specification.

My invention relates to heat storage systems and more particularly to methods and apparatus for operating the same.

According to the heat storage plan in its most approved form, electric energy is supplied continuously at a low rate throughout the day to a heat storage mass having high storage capacity and high heat conductivity. Provision is made for utilizing the heat stored in the aforesaid mass for operations such as cooking, and this means allows the abstraction of the heat from the heat storage mass at a considerably greater rate than that of the input. The heat storage mass is inclosed by heat insulation in order to prevent loss of heat therefrom as much as possible. The object of the heat storage plan is to distribute the demand for electric energy throughout the twenty-four hours. This serves to reduce the peaks in the central station load curve which are occasioned by heavy demands upon the station for limited periods during the day. The central station can afford, therefore, to give a much more favorable rate to the consumer utilizing the heat storage plan, than to one whose demand for energy occurs only at intervals.

The efficiency of an electric heat storage system depends upon the ratio between the heat that is utilized for cooking and other useful operations, to that which is lost by radiation and conduction to the surrounding atmosphere. While the demands for heat for cooking occur only at certain intervals during the day, the losses by radiation and conduction occur continuously throughout the day. In order, therefore, to render the heat storage plan most effective, a very efficient heat insulation must be provided for the heat storage mass. Various highly efficient heat insulations have been devised, such as the electric furnace sublimation products disclosed in the patents of Walter Arthur, Nos. 1,072,413 and 1,072,414, assigned to the same assignee as this application. These insulations serve to reduce the heat loss by conduction and radiation to a reasonably small amount at cooking temperatures and somewhat thereabove.

The question of the rate at which energy should be supplied to a heat storage mass provided with a very efficient heat insulation is quite different from that presented when the insulation is inferior. This is due to the wider variance in the conditions existing during the purely storage and cooking periods. In determining this rate it is obvious to begin with that it must be such at least that the heat storage mass will be raised to a temperature sufficient for conducting the cooking operations which are ordinarily performed upon a range. Moreover, during the cooking operation considerable heat is abstracted from the heat storage mass and it is requisite that at the beginning of such operation the temperature of the heat storage mass be such that it can allow such heat to be abstracted without having its temperature fall to such a point as to render it inoperative. As there must in any case be a certain range of temperatures more suitable than others for conducting cooking operations, the rate of supply must be such that after the temperature of the storage mass has been considerably reduced by cooking or by any other cause, it will not take an unreasonable time for it to assume a temperature within said range. On the other hand, conditions are quite different when no cooking is being done. At such times, the temperature of the heat storage mass will gradually rise to a point where the losses by conduction through the insulation balance the energy input. This temperature will depend upon the rate of energy supplied during such times and upon the efficiency of the insulation. The higher the temperature assumed by the heat storage mass, the greater will be the loss by conduction through the heat insulation, as this loss varies directly as the difference in temperature between the heat storage mass and that of the room in which the range is located. It will therefore be seen that the most effective operation of a heat storage range demands that this temperature be as low as is consistent with the efficient operation of the range as a cooking apparatus. There are other reasons for the limiting of the temperature to which the heat storage mass is raised. An important one is that high temperatures have a detrimental effect upon the heating unit and the other parts of the range which are in good thermal conductive relation with the heat storage mass. The more efficient the insulation and the higher the rate of energy supply, the greater will be the danger that the electric resistance heating unit may burn out. Another consideration is that there is a limit to the temperature at which certain cooking operations can be properly performed. In the case of a range designed for such operations, such limit should not be exceeded.

Heretofore it has been proposed to supply energy at a uniform rate to the heat storage mass regardless of whether it is being used for cooking or is in the purely storage stage, and, therefore, regardless of its temperature. It is apparent from the explanation given above that such a rate must be a compromise between widely different demands, namely, that calling for high rates when the heat storage mass is giving up or has given up a large amount of heat and that calling for a low rate when the heat storage mass is giving up heat at low rate or not at all. The more efficient the heat insulation, the greater the difference between these demands and the greater must be the compromise in determining the uniform rate.

It is the object of my invention to improve the method of operating heat storage systems in the respects above considered and to provide a suitable apparatus for carrying such improved method into operation.

According to my invention, energy is supplied continuously at a low rate to a highly heat insulated electric stove, in which the stove consists of a mass of material having a high heat storage capacity and high heat conductivity and this rate is varied so that when the temperature of the heat storage mass is low, the said rate will be higher than when the temperature of the heat storage mass is high and vice versa. In other words, the rate of energy supply is varied according to the temperature of the heat storage mass. In order that the advantages of this method may be available under all conditions, I provide for a gradual variation of energy supply according to the temperature of the heat storage mass. With this improved method of operation, the most efficient heat insulation may be employed, because no matter how efficient the insulation, the variation in the rate of energy supply will effectually check the temperature to which the heat storage mass can rise. On the other hand, the increase in the supply rate as the temperature of the heat storage mass decreases effectually compensates for the increased loss of heat during the cooking period and provides for a rapid recovery to the normal temperature after such a decrease in temperature however produced.

In carrying out my improved method I prefer to employ an electric resistance heating unit comprising a resistance element whose resistance has a high positive temperature coefficient, since this makes the operation entirely automatic. Iron is a suitable material for the construction of such an element for the reason that the resistance of iron has a comparatively high positive temperature coefficient. In order that the resistance of the heating unit may be quickly affected by the temperature of the heat storage mass and also for the reason that it is desirable that the heat be transmitted quickly from the heating unit to the heat storage mass, great pains should be taken to secure a very close thermal conductive relation between the heating unit and the heat storage mass. A unit of this kind of predetermined dimensions used in connection with an efficiently insulated heat storage mass, will automatically limit the temperature which the storage mass can assume under any conditions.

My invention will be more clearly understood by referring to the accompanying drawing in which—

Figure 2:
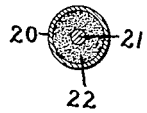
Figure 3:
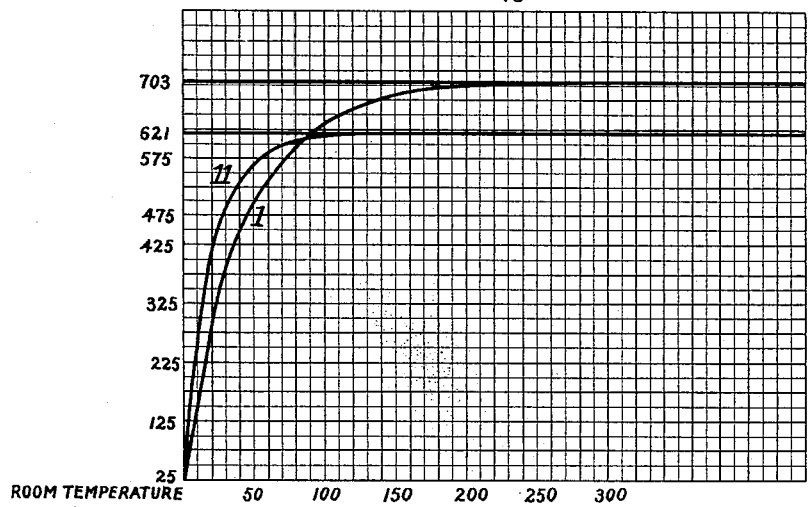

Figure 1 is a partial vertical section showing my invention as applied to a heat storage range of the character disclosed in my Patent No. 1,025,843; Fig. 2 is a sectional view of a portion of the electric resistance heating unit; Fig. 3 is a diagram comprising curves illustrating in part the advantages of my invention.

In Fig. 1, 10 is a heat storage mass composed of iron or other material having high heat storage capacity and high thermal conductivity. In connection with the heat storage mass is shown a disappearing stove 11 provided with insulating cover 12. The stove 11 is adapted to be elevated and lowered by means of the rod 13 which is operated in any suitable manner. The various parts of the range are surrounded by heat insulation 15 and casing 16. The said parts *per se* constitute no part of my invention the same being disclosed in my Patent No. 1,025,843. The heat insulation 15 should be a material having a very high specific thermal resistance. I prefer to employ for this purpose electric furnace sublimation products containing silicon such as those disclosed in the Arthur applications hereinbefore referred to. Embedded in the heat storage mass 10, preferably by casting it in, is the electric resistance heating unit 17. The unit which I have illustrated is of the cartridge type and comprises a body of iron or other metal 18 in which is cast the metal sheath resistance element 19. This metal sheath element comprises a tube of metal 20 such as iron or steel within which is included a resistance element 21 composed of iron or other metal whose resistance has a high positive temperature cofficient. I prefer to use iron for this purpose. Between the said resistance element and the sheath is packed an electric insulation 22 such as silica, lime or other suitable material. I have found that the insulation disclosed in Randolph application, Serial No. 712,874 is highly desirable for this purpose because it is both a good electrical insulator and a good conductor of heat. The metal sheath wire resistance element is provided with suitable terminals 23 such as that disclosed in Dempster application No. 728,341. Connection may be made with an external circuit by means of a plug (not shown) engaging the terminal pins 24 through a bushing 25.

Fig. 3 is a diagram consisting of curves illustrating the difference in behavior of a storage mass equipped with a constant resistance unit and a variable resistance unit, respectively. These curves are plotted from calculations based upon experiment. The storage mass weighed 150 pounds and was inclosed by an insulation having a high heat resistance i. e. 3.83 thermal ohms, a thermal ohm being such a resistance that a difference in temperature of 1° C. would cause a rate of heat flow of 1 watt.

In the first place it was assumed that the heat storage mass must have such capacity that it would deliver 1000 watts for one hour during every 24 hours without having its temperature drop below 485° C. and would recover to a temperature of 575° C. in 23 hours. In the case of the constant resistance unit it was found to be necessary to supply 177 watts continuously in order to secure these results. In the case of the variable resistance unit the number of watts necessary was found to be substantially 309 times the quantity $(1-.000832\ T)$ where $T$=the number of degrees C above room temperature which was 25° C. Curve I shows the behavior of the constant resistance unit and curve II shows that of the variable resistance unit.

The constant resistance unit would require 72 hours to raise the storage mass from room temperature to 575° C., which is a desirable temperature for cooking. After this, the temperature would continue to rise until after 200 hours it would reach a limit, namely 703° C. at which the storage mass would be maintained continuously if no cooking were done. On the other hand, the variable resistance unit would require about 55 hours to raise the temperature of the storage mass to 575° and after this there would be a gradual increase in temperature until after 120 hours, a maximum of about 621° C. would be reached. The constant resistance unit would consume 177 watts continuously. The variable resistance unit would consume 309 watts at room temperature and this consumption would gradually decrease until at 621° C., the maximum temperature, it would be about 156 watts.

It is apparent from the above that the higher consumption of energy at low temperatures by the iron unit results in a considerable reduction in the time required by the heat storage mass in reaching working temperature. Moreover as the temperature of the storage mass increases the wattage consumed by the iron resistance unit gradually decreases until at the maximum, 621° C., it requires only 156 watts or about 88% of that required by the constant resistance unit at its maximum temperature, 703° C. By reason of the fact that the iron resistance unit limits the energy supply and so the temperature of the heat storage mass to a value considerably less than that in the case of the constant resistance unit a considerable waste of energy is prevented, which is very important when it is considered that the heat storage mass is supplied continuously with energy and is used for cooking only a small fraction of the 24 hours. It is also apparent that by thus limiting the temperature of the heat storage mass the likelihood of damage to the heating unit as well as to the other parts of the apparatus is reduced. The diagram serves to illustrate that according to my invention the rate of energy supply is high when a high rate is needful and low when a higher rate would be wasteful and might injure the apparatus.

What I claim as new and desire to secure by Letters Patent of the United States, is:

In combination, an electric stove comprising a highly heat insulated storage mass having high heat storage capacity and high heat conductivity, and means for securing a predetermined delivery of useful energy at the desired temperature and for limiting to a predetermined maximum the ultimate temperature of said stove when no useful energy is being delivered, comprising an electric resistance element composed of a material having a high positive temperature coefficient embedded in said heat storage mass, and a source of electric energy connected to said electrical resistance unit and supplying electrical energy thereto at a low rate.

In witness whereof, I have hereunto set my hand this 14th day of December, 1912.

WILLIAM STANLEY.

Witnesses:
G. K. DRURY,
A. THOMSON.